Feb. 6, 1945. W. M. ALLISON 2,369,002
ROTARY MOTOR
Filed Jan. 18, 1941 4 Sheets-Sheet 1
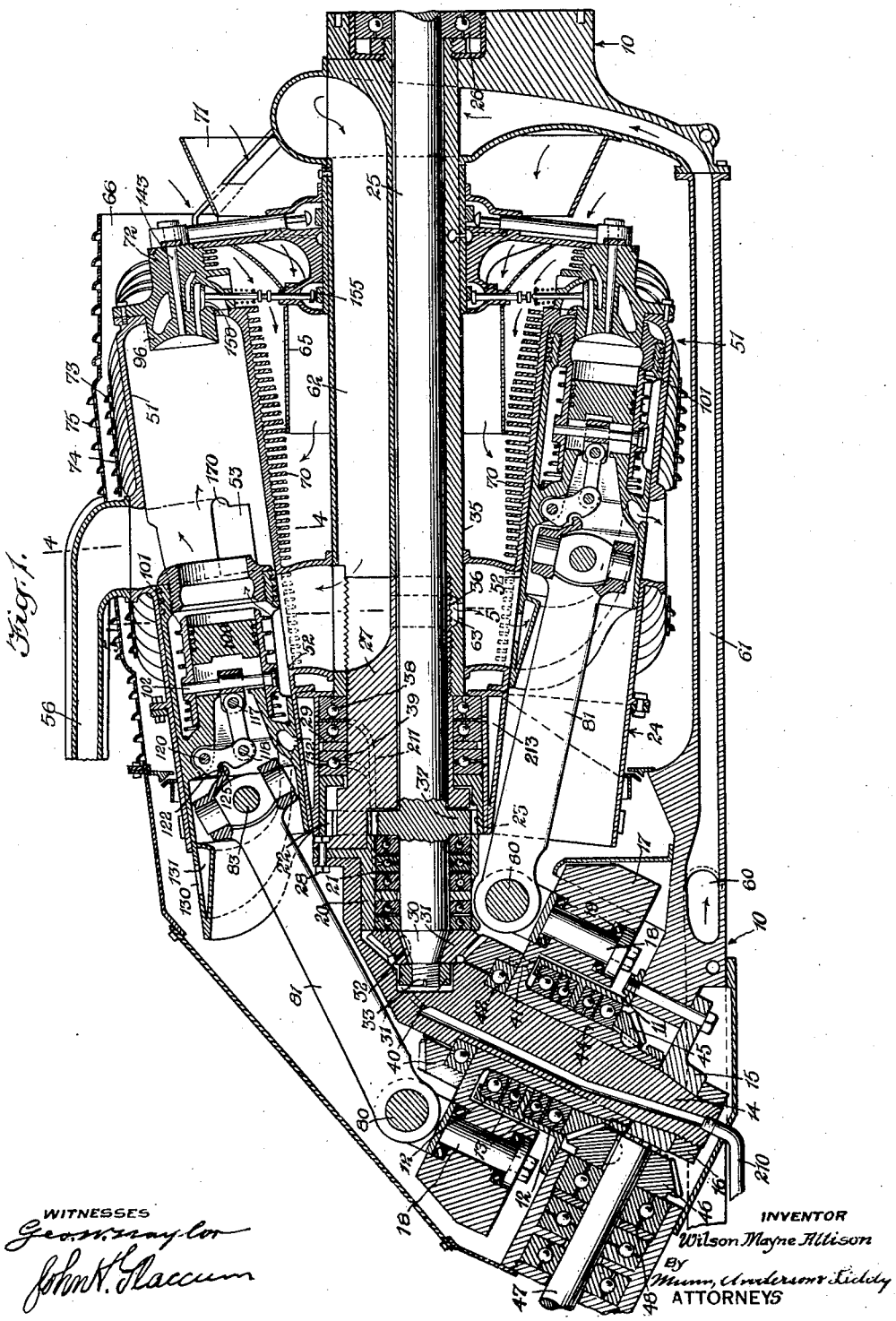
WITNESSES
INVENTOR
Wilson Mayne Allison
By
ATTORNEYS

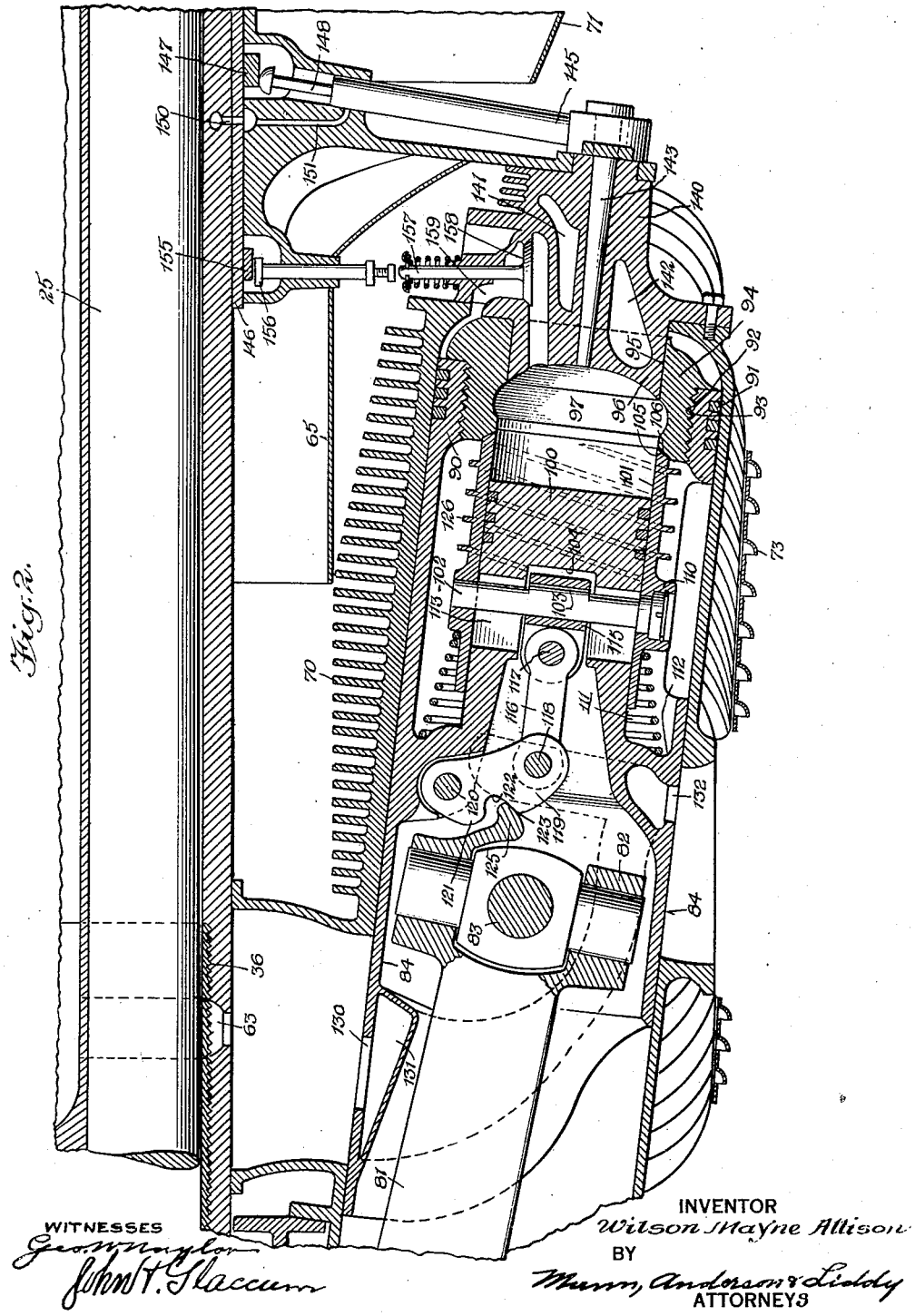

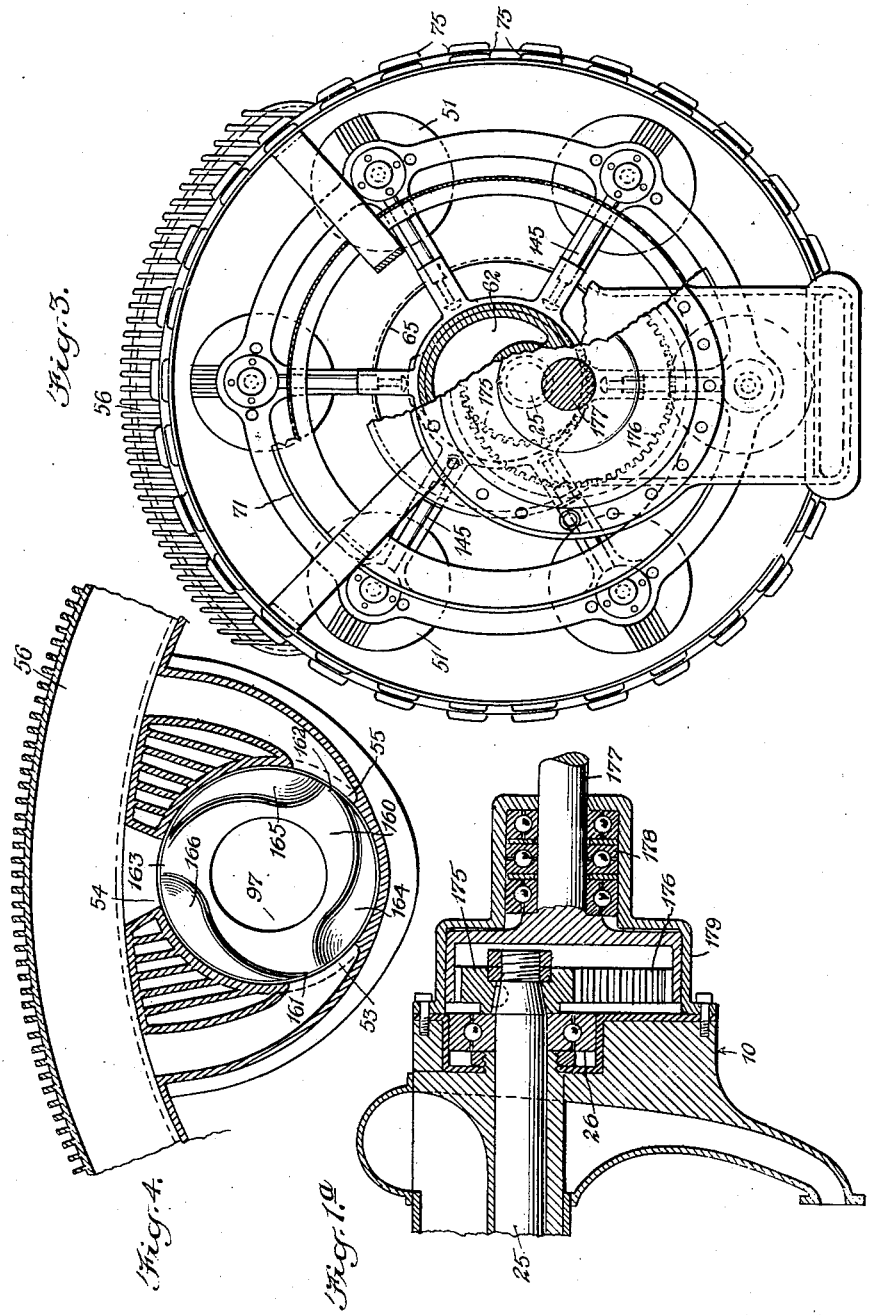

Feb. 6, 1945.     W. M. ALLISON     2,369,002
ROTARY MOTOR
Filed Jan. 18, 1941     4 Sheets-Sheet 4
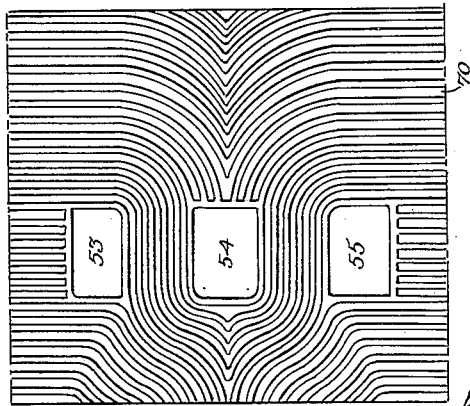
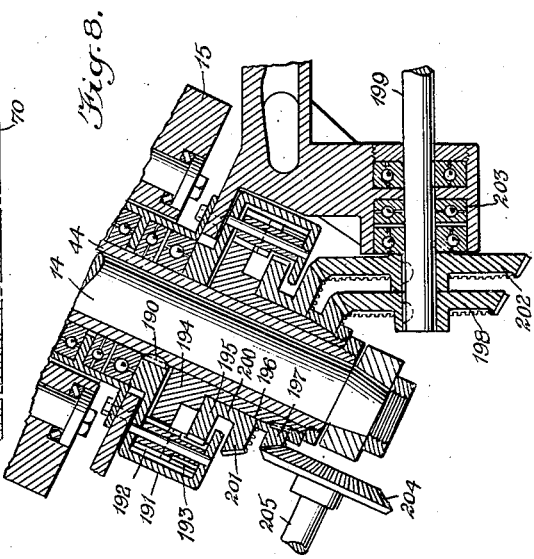
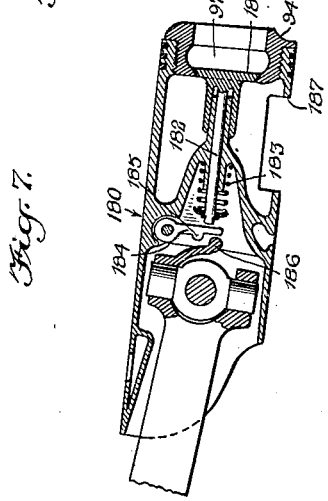
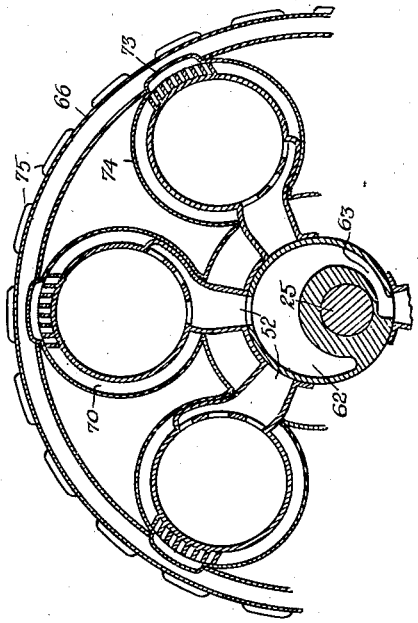
INVENTOR
Wilson Mayne Allison
BY
Munn, Anderson & Liddy
ATTORNEY Patented Feb. 6, 1945

2,369,002

UNITED STATES PATENT OFFICE 2,369,002

ROTARY MOTOR

Wilson Mayne Allison, Knockshegowna, Union of South Africa

Application January 18, 1941, Serial No. 375,068
In the Union of South Africa January 19, 1940

4 Claims. (Cl. 123—47)

This invention relates to motors, and more particularly to internal combustion motors for use as compression ignition motors.

An object of the invention is to provide in a motor means for operating the pistons and the cylinders cooperating with them relative to a rotational mass, such as a flywheel or crank pin carrier member, in such a manner that the pistons and cylinders have differing fundamental rotational paths which produce alternating increasing and decreasing volumetric capacities between the cylinder heads and piston crowns.

One of the purposes of this invention is to provide a motor which is basically rotational rather than reciprocatory in its function, and one in which the loading due to reciprocatory masses is reduced to a minimum. Higher mechanical efficiency is therefore possible due to the elimination of losses associated with reciprocatory masses.

A further object is to provide a motor in which the rotation of the cylinder assembly combined with the rotation of the crank pin carriers in different planes gives a smooth and continuous motion with the least amount of resistance due to the forces of inertia.

A further object is to provide a motor in which the even spacing of the crank pins aids in the elimination of torsional strain and vibration and also permits the use of ball or roller type bearings on the crank pins.

It is a further object to produce a mechanism in which the angle of thrust from each piston remains in the range of useful pressures longer than in present engines, and in which the conversion of gas pressure to torque by angles of thrust is an improvement over the present crank mechanism.

A further object is the elimination of crankshaft flexing, torsional vibration and inaccuracies of valve timing due to the same reasons.

A further object is to provide a motor having inherent fundamentals of design which may be calculated for the most advantageous angles of thrust to give a longer stroke-to-bore ratio, and which when applied to compression ignition engines, where the pressure is very high the piston area due to the longer stroke-to-bore ratio for a given volumetric capacity per cylinder may be less than in prior motors, thus reducing pressures on connecting rod bearings and bearings throughout the motor. Moreover, due to the large individual cylinder capacity, relative to the total capacity, fuel metering in combustion ignition engines is made easier and slight errors in the metering will not produce undesirable pressures or roughness in operation.

A further object is to provide a motor which, when operated as a two-cycle engine with ported cylinders, utilizes centrifugal force due to the rotation of the assemblies to assist in exhaust scavenging, and in which the centrifugal force may also be used in furthering the cooling operation. Due to the rotation of the cylinder assembly around the central spindle, a single cam may be used for fuel pump operation providing accurate means for controlling the required amount of fuel to individual cylinders. The rotation of the cylinder assembly with the necessary functional annulae and passages about the spindle forms a rotary valve. Transfer ports may be functionally opened by the pistons before the transfer is desired, and due to the rapid opening of the valve an extremely rapid air transfer is possible.

Due to the angle of the cylinders with relation to the central spindle, there will be a fallback of the connecting rods when the pistons approach top dead center, thus reducing the speed of the piston slightly and allowing the injection of fuel through a smaller angle of rotation thus avoiding the danger of undesirable pressures.

While my invention may be applied to any use and essentially involves a prime mover, it is particularly adapted to aeroplane work, and one of the objects of the present motor is to provide a smaller frontal area than in present motors of similar capacities and of lower weight per horsepower.

A further object is to provide in a motor, similar to that hereinafter described, a chamber in the piston proper in which the main combustion takes place, the chamber being sealed by a cooperating piston-like extension on the cylinder head. This permits a compression ratio considerably higher than in the normal engine.

A further object is to provide a piston construction, as outlined above, in which the construction of the piston and the piston-like extension on the cylinder head will provide turbulence within the cylinder after ignition, and as a result better combustion.

A further object is to provide a transfer valve in the piston proper to combine proper scavenging of the combustion chamber with the cooling thereof. This construction may use a sleeve poppet valve together with positive means to insure operation.

A further object is to provide an improved form of synchronizing driving gearing.

A further object of this invention is to provide an air cooled improved fin construction which more efficiently governs the air flow with the resultant improved cooling and an air cooling system whereby air passages are provided in the pistons with means for circulating cooling air through said passages as well as around the cylinders and cylinder heads thus producing more efficient cooling.

A further object is to provide, in addition to the ordinary pressure type lubrication, means for supplying to the main bearings adjacent to the heated cylinders and to the cooling jackets at the base of each cylinder an extra amount of oil for cooling purposes and wherein due to centrifugal force the surplus oil will be returned to the engine case.

A further object is to provide in the cylinder heads a chamber for the reception of sodium salts or other cooling medium so constructed that the centrifugal force due to the rotation of the motor causes the cooler and heavier portions of the cooling medium to make contact with the hotter portions of the cylinder head.

A further object is to provide a construction in which the angularity of the cylinders and connecting rods is used to provide an accurate transfer valve operation in which the exhaust ports are closed predeterminedly earlier.

A further object is to provide means for varying the compression ratio by changing the angularity of the connecting rods.

Other objects and advantages of my invention will appear and be discussed as the description proceeds.

In the accompanying drawings—

Fig. 1 is a side elevation in cross section showing a motor embodying my invention;

Fig. 1—A is a continuation of the view shown in Fig. 1;

Fig. 2 is an enlarged detailed view of a single cylinder and piston with the cooperating mechanism;

Fig. 3 is an end view of the motor shown in Fig. 1;

Fig. 4 is a sectional detailed view taken on the line 4—4 of Fig. 1;

Fig. 5 is a cross-sectional view taken on the line 5—5 of Fig. 1;

Fig. 6 is a development of the cylinder wall showing the position of the air fins thereon;

Fig. 7 is a cross-sectional view of a modified form of piston;

Fig. 8 is a sectional view showing a modified form for taking power from the engine.

In the side elevation views parts of the motor in the background have been omitted for the purpose of clarity and in order to avoid confusion.

I provide an outer casing or base 10 in which is mounted a bearing assembly mount 11 including journal bearings 12 and thrust bearings 13. Extending through the bearing assembly mount 11 is a member 14 having a tapered end bolted to the plate 15 by means of the nut 16. Mounted on the bearings 12 and 13 is a crank pin carrier or flywheel 17 carrying the crank pins 18 mounted in suitable bearings 19. The bearing assembly mounting 20 carrying bearings 21 is mounted at one end of the member 14. A shaft 25 has one end carried by the bearings 21 and the other by the bearings 26. The shaft 25 has a pinion 37 integral therewith and having teeth engaging the teeth 22 of an annular gear 23 on the inside of the cylinder assembly mount 24.

A member 27 is bolted with the bearing assembly 20 to the member 14 at 28 and elsewhere and carries the bearing assembly 29 separating it and the cylinder assembly mount 24. The member 27 is threaded at 36 to engage the member 35 which clamps the bearing assembly 29 in place. The bearing assembly 29 includes the bearings 38 and the thrust bearings 39 which take the full thrust of the cylinder assembly mount 24 and of the cylinders 51. By placing these bearings at this point it is possible to lubricate them and cool them as will hereinafter be explained. The bearing assembly mounting 20 is likewise provided with thrust and journal bearings which take the thrust of the shaft 25 and are similarly lubricated and cooled.

The inward end 30 of the drive shaft 25 is tapered and positioned thereon is a beveled helical gear 31 keyed to the shaft by means of the key 32. The shaft 25 has a threaded end 33 engaging a nut 34. The gear 31 engages a similar gear 40 fixed to the flywheel 17 by means of the screws 41, or by other means, so that the position of the gear may be adjusted with relation to the flywheel to vary the relative angular position of the connecting rods.

Journal bearings 42 are provided between the gear 40 and the member 14. The gears 31 and 40 may not be of the same ratio but the rotation of the flywheel or carrier 17 and the cylinder assembly mount 24 are synchronized through the pinion 26 and the internal annular gear 23, so that the ratio between the crank pin carrier and the cylinder assembly is one-to-one.

Mounted on the cylinder assembly mount 24 are the cylinders 51 which may be of any number although I have shown six. The cylinder walls are provided with transfer ports 52 and exhaust ports 53, 54 and 55. Air is supplied to the transfer ports by means of the intake pipe 60 from a conventional supercharger (not shown) through the passage 61 and the passage 62. Air is also supplied through the passage 63 for a purpose which will hereinafter be discussed. The cylinders are bolted to the cylinder assembly mount at 66 and elsewhere.

While it will be appreciated that liquid cooling means may be provided for the cylinders, in my air cooled motor I provide fins 70. The fins 70 are so constructed as to direct the flow of air about the cylinder to produce the most efficient cooling. It will be apparent from the development shown in Fig. 6, that the air will be directed to and around the exhaust ports 53, 54 and 55 where the circulation is most needed, and the fins 70 will run radially on the portion of the cylinders nearest the center of the motor and curve toward a longitudinal direction on the outer surface thereof. It will be appreciated that a predetermined amount of air will be admitted to the front of the motor by the cowling. Certain of this air will pass through the funnel 71 and will be guided by the dividing member 65 down around the lower portion of the cylinder and out through the louvers 73 in the cylinder jackets 74 and through the louvers 75 in the motor casing. Additional air will pass through the opening 66 around and over the cylinder heads 72 between the fins 70 on the upper part of the cylinder and out through the louvers 73 and 75.

The crank pins 18 are provided with the usual pivots 80 which are connected with the connecting rods 81. The connecting rods are provided with a universal connection 82 and are connected to the piston 84 by the cross pin 83.

The upper portion 90 of the piston 84 is provided with the usual rings 91 and is internally threaded at 92 to engage threads 93 of the piston crown 94. The piston crown 94 is hollow in its central portion and its inner walls 95 are adapted to engage with the walls of the cylinder head piston-like extension 96 to form a chamber 97 within the piston itself. Mounted within the piston on the core 100 thereof is a sleeve poppet valve 101. The sleeve poppet valve 101 is positioned on the core by means of the pin 102 through the slot 113 in the core 100. The upper end of the sleeve poppet valve 101 has a mitred valve face 105 which engages a seat 106 on the lower end of the member 94. Piston rings 107 are provided on the core 100 between the side of the core and the sleeve poppet valve. The pin 102 is mounted in bosses 110. These bosses serve to engage a spring 111 mounted in the channel 112 on the inner portion of the piston. The spring 111 presses against the channel 112 and the shoulder 110 to normally maintain the sleeve valve 101 in closed position. It will be understood of course that the pin 102 is mounted in the slot 113 in the core 100 so that the sleeve and the pin may be forced downwardly in the slot 113 to open the valve, that is, to remove the mitred valve face 105 from the seat 106.

A pivot bearing 115 surrounds the pin 102 at the eccentric portion thereof and a link 116 is pivoted to the bearing 115 at 117. At the other end the link 116 is pivoted at 118 to a rocker arm 119. The other end of the rocker arm 119 is pivoted to the pin 120 on the piston 84. The rocker arm 119 is provided with a projection 121, a recess 122 and a contact shoulder 123. The bearing cap 82 has a cam finger 125 which is adapted to engage the projection 121 and the recess 120 at a predetermined point when the piston is on the down stroke. This action causes the rocker arm to pivot on the pin 120 thus exerting a downward pull on the link 116 against the pin 102 and the sleeve 101 causing the valve face 105 to move away from the seat 106. As has previously been pointed out, the pin 102 has an eccentric portion 103 so that the position of the sleeve 101 and the extent of its downward movement may be regulated and adjusted by the turning of the pin 102. As has been pointed out, on the downward stroke the sleeve valve 101 is opened and when the transfer ports 52 register with the air passage 62 the transfer will take place and the air will pass through the sleeve valve through the center of the piston crown 94 thus scavenging and charging the cylinder. On the upward movement of the piston the operating lever 125 releases the shoulder 121 and the spring 111 will close the sleeve poppet valve. In the event that for any reason the sleeve 101 should stick then the operating lever 125 will engage the shoulder 123 and thus give a positive action to assist the spring 111 in moving the sleeve 101 into a closed position. By constructing the opposed faces of the operating lever 125 and the projection 121 wedge-shaped, the valve 101 will be kept open longer on the upstroke than on the down stroke due to the angularity of the connecting rods, thus assuring a better transfer. It will be noted that the sleeve 101 is provided with helical fins 126.

The piston wall is provided with a port 130 which leads to an air passage 131 (shown in dotted lines) and continues through the port 132 in the piston wall. It will be seen therefore that cooling air is intermittently supplied to the interior of the piston as well as to the exterior of the cylinder wall. During the transfer air is of course supplied to the upper portion of the piston and the sleeve 101 thus cooling the sleeve through the helical fins 126 and providing improved turbulence.

A cylinder head 140 is provided with a cooling chamber 141 so constructed that centrifugal force will cause the cooler and heavier portions of the cooling medium, such as sodium salts, to make contact with the hotter portions of the cylinder head. The cylinder head carries an injector 143 which communicates with the fuel pump 145 and which injects fuel into the chamber 97 at a predetermined time. Mounted on the upper portion of the member 35 is a wearing sleeve 146 in which is mounted a cam ring 147. The valve 145 is provided with a tappet 148 adapted to be engaged by the high point of the cam ring 147 to operate the pump at the proper time. An annulus 150 supplies fuel through the passage 151 to the pump 145. Also mounted on the wearing sleeve 146 is a cam ring 155 having a high point to operate the tappet 157 for the valve 158 mounted in the cylinder head 140. It will be appreciated that on the upward motion of the piston air will be forced through the passage 159 by the piston crown 94. The valve 158 will be opened at a predetermined time by the high point of the cam ring 155 and will close at a predetermined time before combustion to allow passage of air from the passage 159 into the chamber 97.

The top 160 of the piston crown 94 is provided with a plurality of high points depending upon the number of exhaust ports provided on the cylinder. In the drawings the cylinder is shown with three exhaust ports and accordingly three high points 161, 162 and 163 are provided. Between each high point the piston crown slopes downwardly and falls away at 164, 165 and 166. Since in this type of motor the cylinders rotate about the pistons, this construction allows better and more efficient scavenging. It will be noted that the exhaust port 53 as well as the other ports are provided with a shoulder 170 defining an extended opening 171. The opening 171 cooperates with the high points 161, 162 and 163 and the tapered portions 164, 165 and 166 so that on the down stroke the exhaust ports register with the tapered portions and are uncovered more quickly, while on the upward stroke the high points 161, 162 and 163 register with the extension of the exhaust ports and close them sooner than if the piston crown were flat.

As shown in Fig. 1—A, the shaft 25 at its outer end carries a gear 175 which engages the teeth of the annular gear 176 driving the propeller shaft 177. Suitable bearings 178 are provided for the shaft 177. A housing 179 may be provided for housing the shaft 177 and the bearing assembly 178.

The flywheel 15 has an extension 44 extending through the bearings 12 and 13. The beveled helical gear 45 is keyed to this extension and engages a similar gear 46 keyed to the shaft 47 in the bearing assembly 48 to rotate said shaft with the flywheel. The shaft 47 may be used to operate the motor accessories such as the supercharger, etc.

In Fig. 7 a modified piston 180 is shown. This piston is constructed in the same manner as the one previously discussed with the chamber 97 in its upper end 94 but is supplied with a poppet valve 181. A valve stem 182 runs through the core of the piston and the valve is yieldingly maintained in closed position by the spring 183. A pivotal arm 184 having a cam 185 is adapted to be engaged by the finger 186 when the piston is in the exhaust stroke due to the angularity of the connecting rod at that point. This forces the arm 180 against the stem 182 and allows the transfer to take place through the port 187.

Due to the design of this particular type of engine the increase of the cylinder capacity increases the power output at a much greater ratio than the gears 31 and 40 are increased, and as a result the toothed surface of the gears may be insufficient for driving purposes. In such a case these gears may be used merely for synchronizing purposes, and the shaft 25 forward of the pinion 37 with its driving mechanism is eliminated.

Where a motor involving a larger horsepower is involved, a spur gear differential, as shown in Fig. 8, may be more desirable than that previously discussed. The extension 44 of the flywheel or crank pin carrier 15 is keyed at 190 to the annular housing 191. A plurality of overlapping gears 192 and 193 engaging each other are mounted in the housing and the gear 192 in turn engages the gear 194 while the gear 193 engages the gear 195. The gear 194 is provided with an extension 196 provided with a spiral beveled gear 197 which engages the spiral beveled gear 198 keyed to the shaft 199. The gear 195 has an extension 200 carrying the gear 201 which engages the gear 202 on the shaft 199. A suitable bearing assembly 203 is provided for the power shaft 199. An additional spiral beveled gear 204 engaging the shaft 205 is provided for driving accessories. It will be appreciated that this construction will provide greater tooth surface for driving the shaft 199 and will take up any play due to the wearing of the gears 196, 197, 198, 201 and 202.

Lubricating oil may be fed to the bearings through the pipe 210 in the member 14 and through the dotted passages 211 to the oil jacket 213 on the lower portion of the cylinders. Due to centrifugal force the oil will be forced through the jacket 213 cooling the bottom of the cylinders and will be returned to the crankcase.

In operation the cylinders will take air under pressure from the supercharger through the transfer ports 52 and through the sleeve valve in the hollow piston crown. As the piston moves upwardly in the cylinder the exhaust ports will be closed off by the high points on the piston crown before the transfer port is completely closed. As the air is compressed the valve in the cylinder head will open and will close at a predetermined time before ignition. Fuel will be injected into the reduced combustion chamber and the downward stroke will be started. As the piston moves downwardly and as the piston crown uncovers the piston-like extension of the cylinder head considerable turbulence will be set up due to the difference in pressures between the combustion chamber and the cylinder proper. As a result, better combustion will occur. As the piston continues the downward stroke the exhaust ports will register with the lower parts of the piston crown and will be uncovered before the transfer ports register with the air passage thus allowing the pressure in the cylinders to fall before the transfer takes place.

It will readily be appreciated that because of the reduced combustion chamber 97 formed by the extension 96 on the cylinder head in the end of the piston 94, the area upon which extreme pressures operate during primary combustion will be considerably reduced thereby permitting a higher combustion ratio without increasing the loading on the connecting rods, crank pins and other moving parts.

It will also be appreciated that because of the planning of the fins and the direction of air to said fins, the cooling of my motor will be more complete and efficient than in orthodox types. The efficiency of the cooling is increased by the introduction of air into the inside of the piston. It will also be appreciated that the link mechanism and cam action described for operating the sleeve valve in the piston will do away with any possibility of sticking.

I claim:

1. In a rotary motor, a plurality of cylinders, a piston in each of said cylinders, transfer ports in said cylinders, means for introducing air under pressure to said transfer ports, an air passage in said pistons to allow the passage of air into the interior of said pistons and means to allow the air to escape therefrom, said means including a plurality of openings in the cylinder wall adapted to be uncovered by the piston on the down stroke, and a plurality of low points on said piston crown adapted to cooperate with said openings.

2. In a motor of the class described, a plurality of cylinders, a piston in each of said cylinders, a connecting rod for each piston, a transfer valve in said piston, spring means for normally keeping said transfer valve closed, means for opening said transfer valve, said means including a cam finger on said connecting rod, a member operating said valve, a rocker arm cooperating with said member whereby said cam finger engages said rocker arm when said connecting rod is at a predetermined angle and whereby said cam finger disengages said rocker arm and exerts pressure against said rocker arm to assist said spring means when said connecting rod is at another predetermined angle.

3. In a motor of the class described, a piston, a connecting rod, a transfer valve in said piston, means for opening said transfer valve, said means including a cam finger on said connecting rod, a member operating said valve, a link connecting said member and piston wall, said link having a recess therein forming two contact shoulders and adapted to be engaged by said cam finger whereby said cam finger will engage one of said shoulders when said connecting rod is at a predetermined angle, and whereby said cam finger will engage the opposite shoulder when said connecting rod is at another predetermined angle.

4. In a motor, a cylinder, a piston cooperating with said cylinder, a connecting rod on said piston, said piston having a central core and an outer wall defining with said central core a passage surrounding said core, a hollow head on said piston, a sleeve valve positioned on said core and engaging the bottom of said hollow head, a slot in said core, a pin extending through said sleeve valve and said slot, a port in said piston wall communicating with said sleeve valve, an arm connected with said pin, a link connecting said arm to said piston wall, said link having a recess therein defining two contact shoulders, a finger on said connecting rod adapted to engage one of said shoulders to open said sleeve valve when the connecting rod is at one predetermined angle and adapted to engage the other of said contact shoulders to insure the closing of said sleeve valve when the connecting rod is at another predetermined angle.

W. M. ALLISON.